United States Patent
Sachs et al.

(10) Patent No.: US 9,357,130 B2
(45) Date of Patent: May 31, 2016

(54) DYNAMIC BRACKETING OPERATIONS FOR IMAGE STABILIZATION

(71) Applicant: Apple Inc., Cupertino, CA (US)

(72) Inventors: Todd Sachs, Palo Alto, CA (US);
Marius Tico, Mountain View, CA (US);
Rolf Toft, Palo Alto, CA (US); Paul Hubel, Mountain View, CA (US);
George Williams, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 233 days.

(21) Appl. No.: 13/909,700

(22) Filed: Jun. 4, 2013

(65) Prior Publication Data

US 2014/0267802 A1    Sep. 18, 2014

Related U.S. Application Data

(60) Provisional application No. 61/787,946, filed on Mar. 15, 2013.

(51) Int. Cl.
*H04N 5/228* (2006.01)
*H04N 5/232* (2006.01)
*H04N 5/235* (2006.01)

(52) U.S. Cl.
CPC ......... *H04N 5/23267* (2013.01); *H04N 5/2356* (2013.01); *H04N 5/23254* (2013.01); *H04N 5/23258* (2013.01)

(58) Field of Classification Search
CPC .................................................. H04N 5/23248
USPC .......................................... 348/208.6, 208.4
See application file for complete search history.

(56) References Cited

U.S. PATENT DOCUMENTS

| | | | | |
|---|---|---|---|---|
| 7,852,374 B2 * | 12/2010 | Kaneko | .............. | H04N 5/23248 348/208.4 |
| 2002/0179819 A1 * | 12/2002 | Nahum | .................. | G01B 11/02 250/208.1 |
| 2010/0295954 A1 * | 11/2010 | Kotani | ....................... | 348/208.4 |

* cited by examiner

*Primary Examiner* — Antoinette Spinks
(74) *Attorney, Agent, or Firm* — Blank Rome LLP (57) ABSTRACT

Techniques are disclosed for selectively capturing, retaining, and combining multiple sub-exposure images or brackets to yield a final image having diminished motion-induced blur and good noise characteristics. More specifically, after or during the capture of N brackets, the M best may be identified for combining into a single output image, (N>M). As used here, the term "best" means those brackets that exhibit the least amount of relative motion with respect to one another—with one caveat: integer pixel shifts may be preferred over sub-pixel shifts.

20 Claims, 5 Drawing Sheets

DYNAMIC BRACKETING OPERATIONS FOR IMAGE STABILIZATION

BACKGROUND

This disclosure relates generally to the field of digital image photography and, more particularly, to methods, devices and systems to dynamically capture and select multiple images so as to mitigate image blur due to motion. As used herein, the term "camera" refers to any device capable of capturing a digital image. Illustrative camera devices include digital single-lens reflex cameras (DSLR), compact or point-and-shoot cameras, embedded image capture devices such as those found in mobile telephones, and multispectral imaging equipment used in, for example, the medical field.

During normal operations, a camera's auto-exposure ("AE") system can adjust the camera's exposure time, aperture, gain/ISO, and the use of pixel binning operations to achieve an optimal exposure value (EV). By way of example, if the light level in a scene decreases an AE system can compensate by increasing the camera's exposure time, opening its aperture, adding gain (to the signals coming from the camera's sensor element), combine pixels (pixel binning), or some combination of these operations in order to obtain an image of sufficient brightness. The relationship between these parameters is generally referred to as "exposure program modes."

To mitigate image blur caused by camera motion (e.g., "hand-shake"), one mode might avoid longer exposure times by increasing the camera's aperture and/or gain. These adjustments, however, can result in images with decreased depth of focus and/or increased levels of noise. Thus, it would be beneficial to provide a mechanism to avoid or reduce the effect of these problems by adjusting a camera's image capture, selection and fusion operations based, at least in part, on camera motion.

SUMMARY

In one embodiment the inventive concept provides a method to selectively capture and retain short-exposure images which, when combined, provide an image with reduced motion-induced blur and acceptable noise characteristics (compared to an image captured using a longer exposure). Methods include receiving an initial exposure time such as may be provided by a camera's auto-exposure mechanism. This initial exposure time may be divided or partitioned into two or more sub-exposure times and an image captured during each sub-exposure time period (hereinafter referred to as a "bracket"). From the captured brackets, a (proper) subset of brackets may be selected and subsequently combined into a single image. In one embodiment, the act of selecting a subset of brackets may be based, at least in part, on camera motion. Such motion may be detected by one or more motion sensors integral to the camera (e.g., a gyro sensor). In addition, captured brackets may each have associated motion metadata (e.g., translation factors, rotation factors, pitch factors, yaw factors, or roll factors) that may be used during the bracket selection process. In another embodiment, a proper subset of brackets may be obtained by preferentially selecting, for each consecutively captured pair of brackets, those brackets that are wholly coincident or shifted an integer number of pixels with respect to one another. In one embodiment, all of the brackets may be captured and the subset of brackets selected thereafter. In another embodiment, the subset of brackets may be selected during bracket capture operations. A computer executable program may written using any suitable programming language to implement the disclosed methods. As will be known, computer executable program code may include one or more modules and be stored in one or more memories during execution (by one or more processing units) and one or more non-transitory storage devices otherwise.

In another embodiment, the inventive concept may be implemented using one or more circuits as part of a digital image capture device (aka, camera). Illustrative devices include, but are not limited to, stand-alone digital cameras, point-and-shoot digital cameras and devices having embedded therein, an image capture subsystem (e.g., as found in mobile telephones and portable computer systems). All such devices may include sufficient memory and storage to accommodate program code as described above, and one or more processors (general or special purpose) capable of executing the program code.

DETAILED DESCRIPTION

This disclosure pertains to systems, methods, and computer readable media for selectively capturing, retaining, and combining multiple sub-exposure images or brackets to yield a final image having diminished motion-induced blur and good noise characteristics. More specifically, various techniques are disclosed for identifying and retaining a subset of the captured brackets that, when combined, yield a final image having the above-identified characteristics. As used herein, the phrase "exposure time" refers to an image capture time as determined by, for example, a camera's auto-exposure (AE) mechanism. The phrase "sub-exposure time" refers to an image capture time that is less than the exposure time. The phrases "sub-exposure time image" or "bracket" refer to an image whose exposure time is a sub-exposure time. It will be recognized and understood that as the exposure time (or any other capture parameter) is changed, concomitant changes may also need to be made to other parameter values so as to maintain or approach the camera's target exposure value. For simplicity, and without loss of any generalization, only exposure time will be discussed in the remainder of this disclosure. It will be assumed that other image capture parameter values are adjusted to support or comport with the modified exposure time.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system-and business-related constraints), and that these goals may vary from one implementation to another. It will also be appreciated that such development efforts might be complex and time-consuming, but would nevertheless be a routine undertaking for those of ordinary skill in the design and implementation of image processing systems having the benefit of this disclosure.

When composing a final image made up of two or more brackets, it can be important to select the correct brackets. This is because to combine multiple brackets and achieve the signal-to-noise ratio (SNR) of a single longer exposure image, the brackets must first be registered to one another to account for any (e.g., three dimensional) shifts and/or rotations between them. The time and computational resources needed to properly register images can be substantial. This burden may be significantly reduced in accordance with this disclosure.

Figure 1:
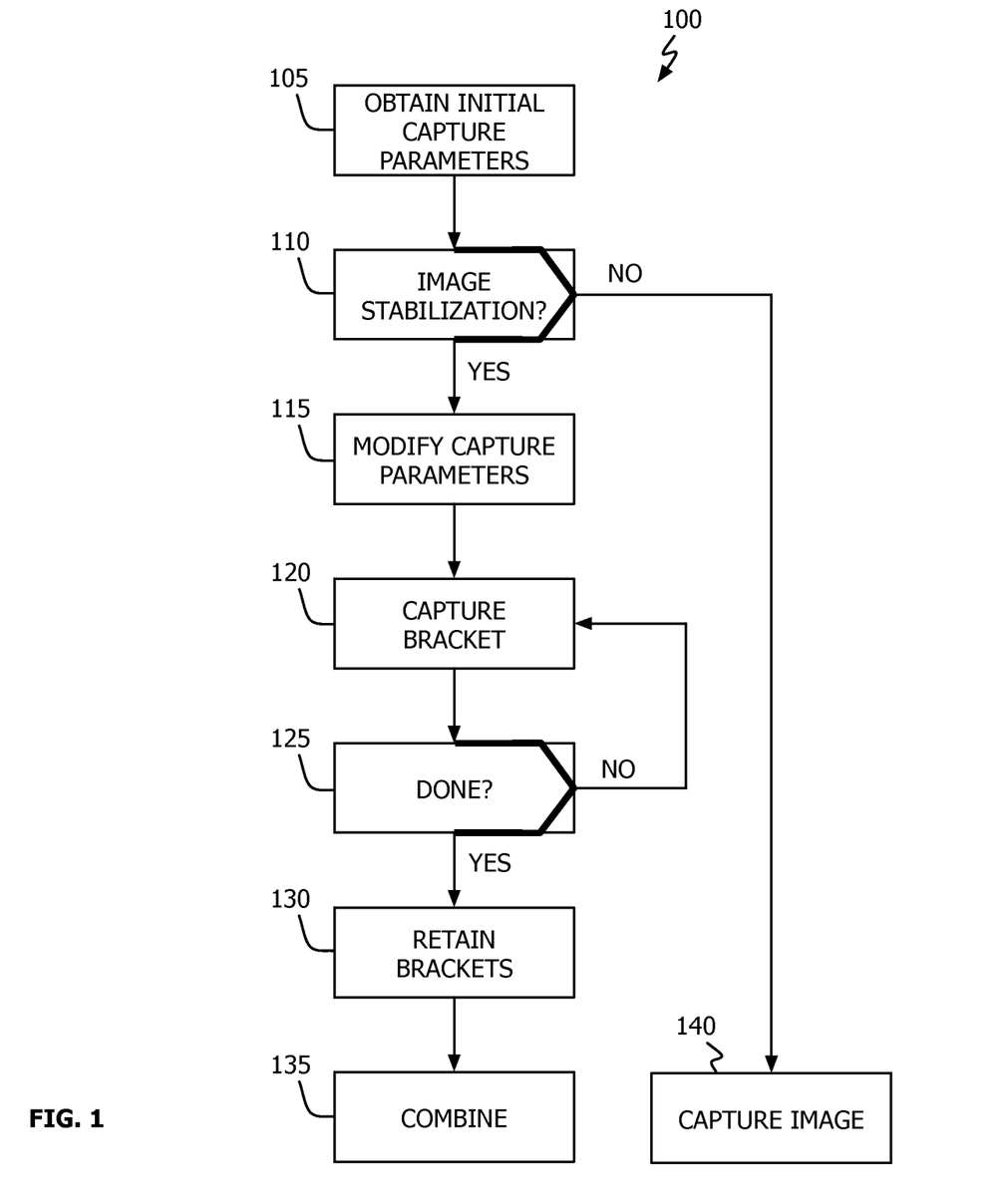
FIG. 1 shows, in flowchart form, an image capture operation in accordance with one embodiment.

Referring to FIG. 1, image capture operation 100 in accordance with one embodiment may begin when initial image capture parameter values are obtained (block 105). For example, a camera's AE mechanism may supply initial values for the exposure time ($t_{AE}$), gain/ISO ($g_{AE}$), and aperture ($a_{AE}$). Alternately values for exposure time, gain/ISO, and aperture may come from manual configuration via the device's user interface. A determination may then be made as to whether image stabilization would be beneficial (block 110). Image stabilization may be beneficial where there is significant camera motion during the exposure time, such as in the relatively long exposures selected for low light conditions.

It will be understood that many cameras include one or more motion sensors (e.g., gyro sensors and/or accelerometers). Measurements from these sensors may be used to determine a "motion metric," the value of which represents a camera's motion along one or more axes.

In one embodiment, a motion metric may be based, at least in part, on an autofocus statistic (e.g., statistic(s) derived from the high frequency components of an image). In another embodiment, a motion metric may be based on one or more motion measurements (e.g., translation, rotation, pitch, roll and yaw). In practice, a motion metric may be compared to a threshold value (e.g., motion metric<threshold value or motion metric≥threshold value). The choice of which, and whether to combine methods using a weighted voting scheme employing heuristics, embodies the designer's decision as to how much motion is "too much motion," and may depend on the physical characteristics of the camera (e.g., image sensor and lens assembly) as well as the camera's intended use.

If the motion metric's value is less than the specified threshold (the "NO" prong of block 110), a single image may be captured using the initially obtained capture parameter values (block 140). If the motion metric's value is greater than the specified threshold (the "YES" prong of block 110), image stabilization operations in accordance with this disclosure may adjust or modify one or more of the initial image capture parameter values (block 115).

In one embodiment, the initial exposure time $t_{AE}$ may be divided into N sub-exposure periods ($t_B$), with a bracket captured during each such sub-exposure period. While the selection of N is outside the scope of this disclosure, one method of determination would be to use a pre-defined $t_B$ and capture as many brackets as possible during $t_{AE}$ (the number of captured images being N). Another way might be to capture as many brackets as possible during $t_{AE}$ using the shortest $t_B$ that does not result in excessive pixel blurring at the measured level of motion (again, the number of captured images being N).

Modified capture parameter values in accordance with block 115 may be used to capture a first bracket (block 120), whereafter a check may be made to determine if all N brackets have been captured (block 125). Each bracket, as it is captured, may be tagged with motion metadata (e.g., x-axis, y-axis and rotation information). As discussed further on, this information may be used with other information based on image analysis to determine bracket-to-bracket motion or shift. If additional brackets remain to be captured (the "NO" prong of block 125), the next bracket may be captured in accordance with block 120. If all brackets have been captured (the "YES" prong of block 125), the M best brackets may be identified (block 130) and combined into a final image, where M<N (block 135). In practice, the M best brackets constitute a proper subset of the N total brackets captured. That is, M is strictly contained in the set of N brackets and so necessarily excludes at least one member of the N originally captured bracket. In another embodiment, the check employed in block 125 may be made with respect to $t_{AE}$. That is, determining $t_{AE}$ has not expired may be equivalent to determining that not all brackets have been captured (the "NO" prong of block 125). In like fashion, determining $t_{AE}$ has expired may be equivalent to determining that all brackets have been captured (the "YES" prong of block 125). As used herein, the term "best" means those brackets that exhibit the least amount of relative motion with respect to one another—with one caveat: integer pixel shifts may be preferred over sub-pixel shifts. For example, if a first bracket A is shifted ½ pixel from another bracket B, and a third bracket C is shifted a full pixel from bracket B, bracket C may be preferred over bracket A even though it is "further away" from bracket B. This is because shifting a bracket a whole number of pixels may be done quickly and efficiently, whereas sub-pixel shifts can require significant computation and introduce error.

Figure 2:
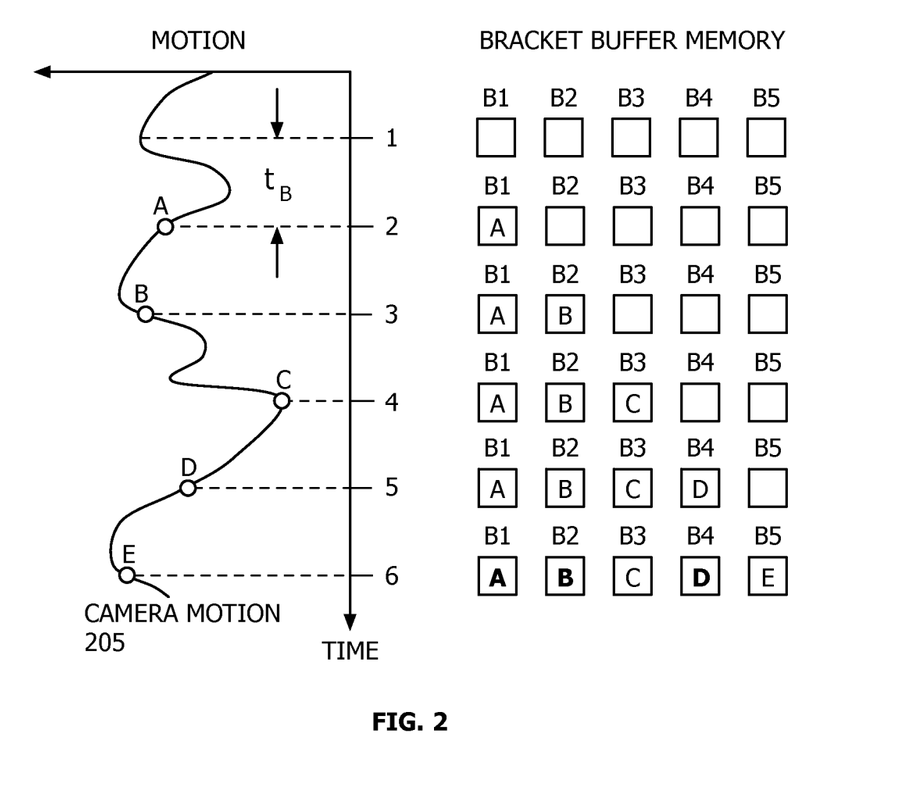
FIG. 2 illustrates an illustrative bracket capture operation in accordance with one embodiment.

An illustrative bracket capture sequence in accordance with blocks 120-125 in which N=5 and M=3 is illustrated in FIG. 2. The left-half or side of FIG. 2 shows a camera's motion 200 along one axis as a function of time (e.g., yaw or pitch or roll or x-axis translation, or y-axis translation or rotation). It should be understood that an actual implementation may use a motion measure that takes into account multi-axis motion. Single axis motion is adopted here for simplicity of explanation. Also shown is exposure time $t_{AE}$ and its partition into 5 (N) sub-exposure times $t_B$. The right-half or side of FIG. 2 shows the content of bracket buffer memory over time. At time=1 the bracket capture sequence begins and bracket buffer memory is empty. At time=2 (after a period of $t_B$), bracket A may be captured and stored in bracket buffer memory B1. At time=3, bracket B may be captured and stored in bracket buffer memory B2. This process continues until, at time=6, bracket E is captured and stored in bracket buffer memory B5. With all 5 (N) brackets captured, image metadata may be used to identify the 3 (M) best in accordance with block 130. In one embodiment, being "best" may mean being closest in a Hamming distance sense. In the one-dimensional example of FIG. 2, brackets A, B and D are closer than any other combination of 3 brackets. As previously noted, the identification of brackets to retain (for subsequent fusion) may be subject to a full pixel offset constraint. For example, if bracket D were offset from bracket B (or A) by ½ pixel and bracket E were offset by 2 full pixels, brackets A, B and E may be favored over A, B and D. In practice, closeness may be determined by generating distance histograms for each bracket based on metadata acquired at capture time (e.g., roll, pitch and yaw motion metadata). When this is done, the M brackets closest to the histogram's mode are the M brackets that should generally be retained (subject, perhaps again, to a full-pixel constraint). Also in practice, brackets may be associated with motion along more than one axis.

Figure 3:
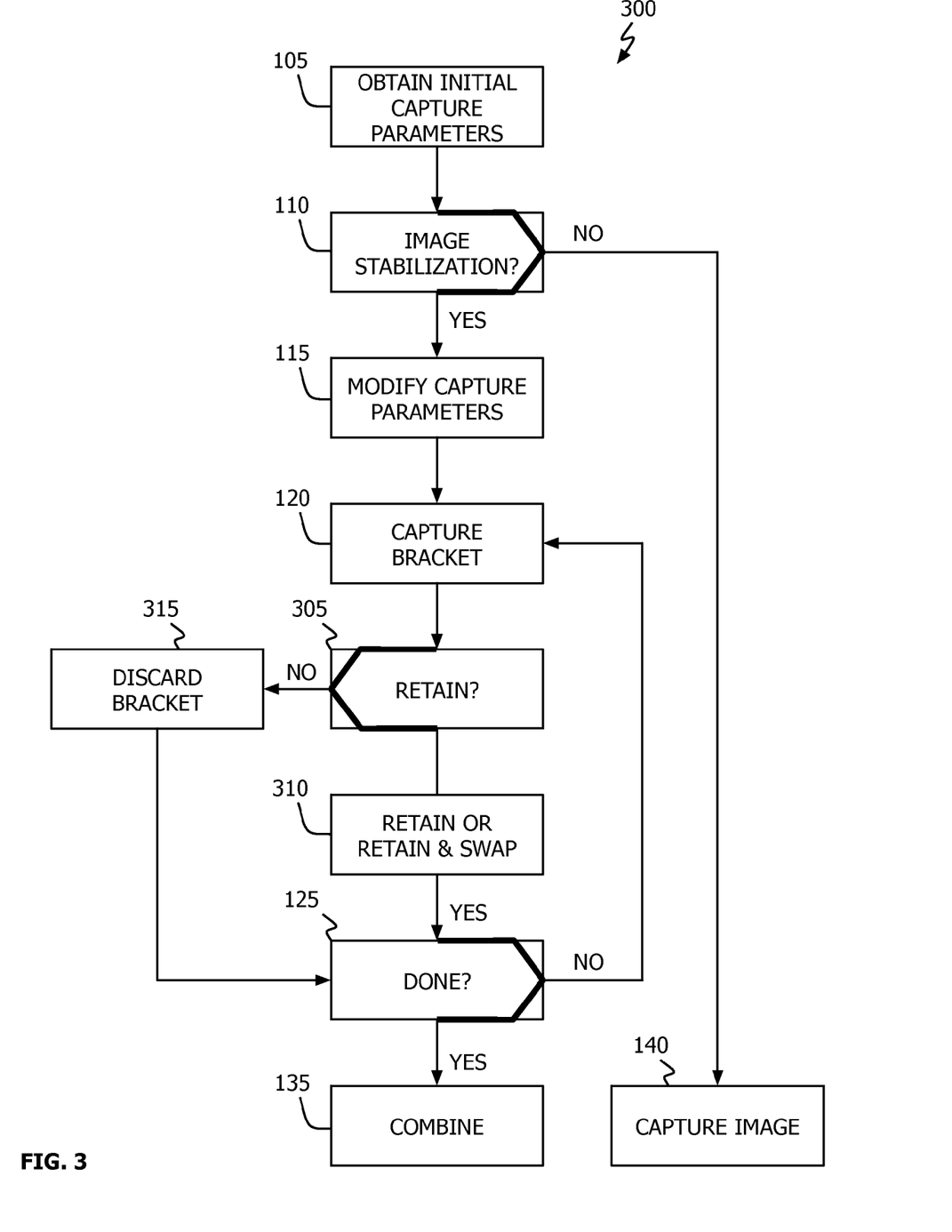
FIG. 3 shows, in flowchart form, an image capture operation in accordance with another embodiment.

Referring to FIG. 3, image capture operation 300 in accordance with another embodiment may begin as did image capture operation 100 (blocks 105-120). In accordance with operation 300 however, only the best M of the N captured brackets may be retained—as the N brackets are captured (M<N). Again, M may constitute a proper subset of the captured N brackets. More specifically, once a bracket is captured (block 120), a check may be made to determine if the current bracket should be retained (block 305). In one embodiment, a bracket may be retained if it is "closer" to one prior-captured bracket than another prior-captured bracket. As noted above, closeness may be determined by generating distance histograms for each bracket based on metadata acquired at capture time. When this is done, a newly captured bracket may be compared to those already captured and, if closer to a previously retained bracket (the "YES" prong of block 305), it may be retained (block 310). In addition, if the available bracket memory is full (i.e., M brackets have already been captured), the prior-captured bracket that is furthest from the mean or mode of the histogram may be discarded (block 310). If the current bracket is not closer to the prior-retained average/histogram mode (the "NO" prong of block 305), the current bracket may be discarded (block 310), whereafter image capture operation 300 resumes at block 125 and thereafter proceeds as did operation 100.

Figure 4:
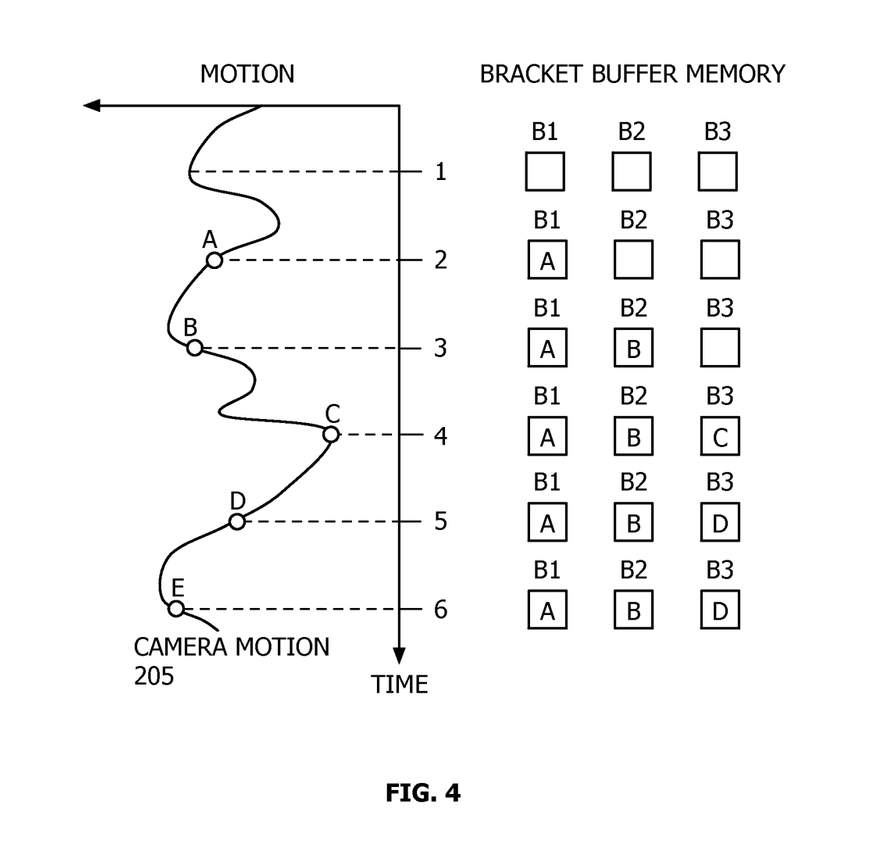
FIG. 4 illustrates an illustrative bracket capture operation in accordance with another embodiment.

An illustrative bracket capture sequence in accordance with operation 300 in which N=5 and M=3 is illustrated in FIG. 4. The left-half or side of FIG. 4 shows the same camera motion profile as used when discussing FIG. 2. The right-half or side of FIG. 4 shows the content of bracket buffer memory over time when there is not enough memory to hold all of the N brackets that are captured. At time=1 the bracket capture sequence begins and bracket buffer memory is empty. At time=2 (after a period of $t_B$), bracket A is captured and retained in bracket buffer memory B1. At time=3 (after another $t_B$ period), bracket B is captured and retained in bracket buffer memory B2. At time=4, bracket C is captured and retained in bracket buffer memory B3. At time=5, bracket D is captured. Having previously captured and retained brackets A, B and C, there is no "space" for bracket D. In accordance with block 305, a check may be made to determine that block D is closer to blocks A and B than is block C. In accordance with block 310, block C could be discarded and block D retained as illustrated. Finally, at time=6, bracket E may be captured and determined to be further from the mean/mode than any of brackets A, B and D. Bracket E is therefore discarded in accordance with block 315.

Figure 5:
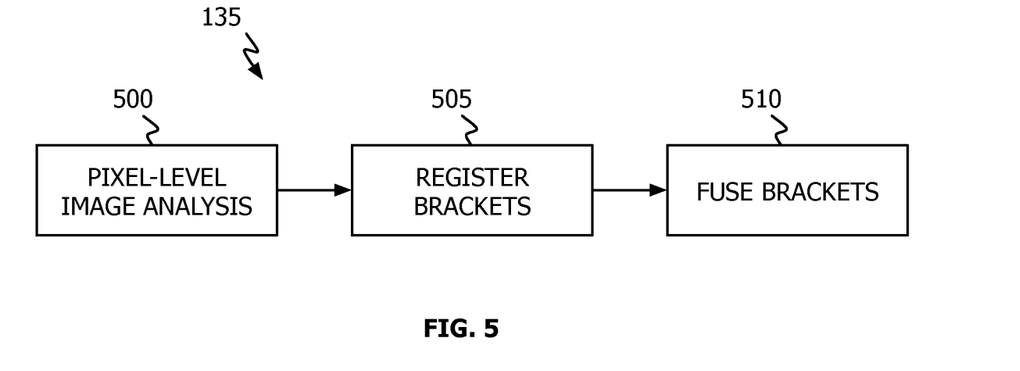
FIG. 5 illustrates a combine operation in accordance with one embodiment.

In another embodiment, bracket capture operations in accordance with this disclosure may be continued until M brackets are retained that meet a specified relative motion criteria (e.g., less than 4 pixels and/or on even pixel boundaries). In still another embodiment, bracket retention may be truncated at a specified time (e.g., $t_{AE}$ or $t_{AE}$ plus/minus a stated time period). In yet another embodiment, from a capture sequence of N brackets, the M best brackets may be retained and, retrospectively, the X best identified and combined (X<M). Referring to FIG. 5, in another embodiment, combine operation 135 my include pixel-level analysis of the retained brackets so as to determine object motion (block 500). That is, apparent motion of objects in the captured scene (not detectable by a camera sensor). This knowledge may be used in addition to that determined in accordance with FIGS. 1-4 to register (block 505) and fuse (block 510) the retained brackets. In accordance with one embodiment, fuse operations 510 may be based at least in part on the bracket shifts determined in accordance with, for example, block 130 or blocks 300-315. For example, if the retained brackets overlap completely, they may simply be averaged together (computationally inexpensive). If brackets are an integer number of pixels shifted with respect to one another, they may simply be shifted and then averaged (again, computationally inexpensive). If the best retained brackets are sub-pixel shifted from one another, more conventional image fusion operations may be needed (these are generally computationally expensive in terms of time and memory).

As the illustrative examples described above show, if N brackets are captured during an initially specified exposure time (e.g., as determined by a camera's AE mechanism): in one embodiment, all N brackets may be captured and, retrospectively, the M best identified and retained (M<N); in another embodiment, the M best brackets may be retained as the N brackets are captured (M<N); in yet another embodiment, the M best brackets may be retained initially and, retrospectively, the X best identified and retained (X<M).

Figure 6:
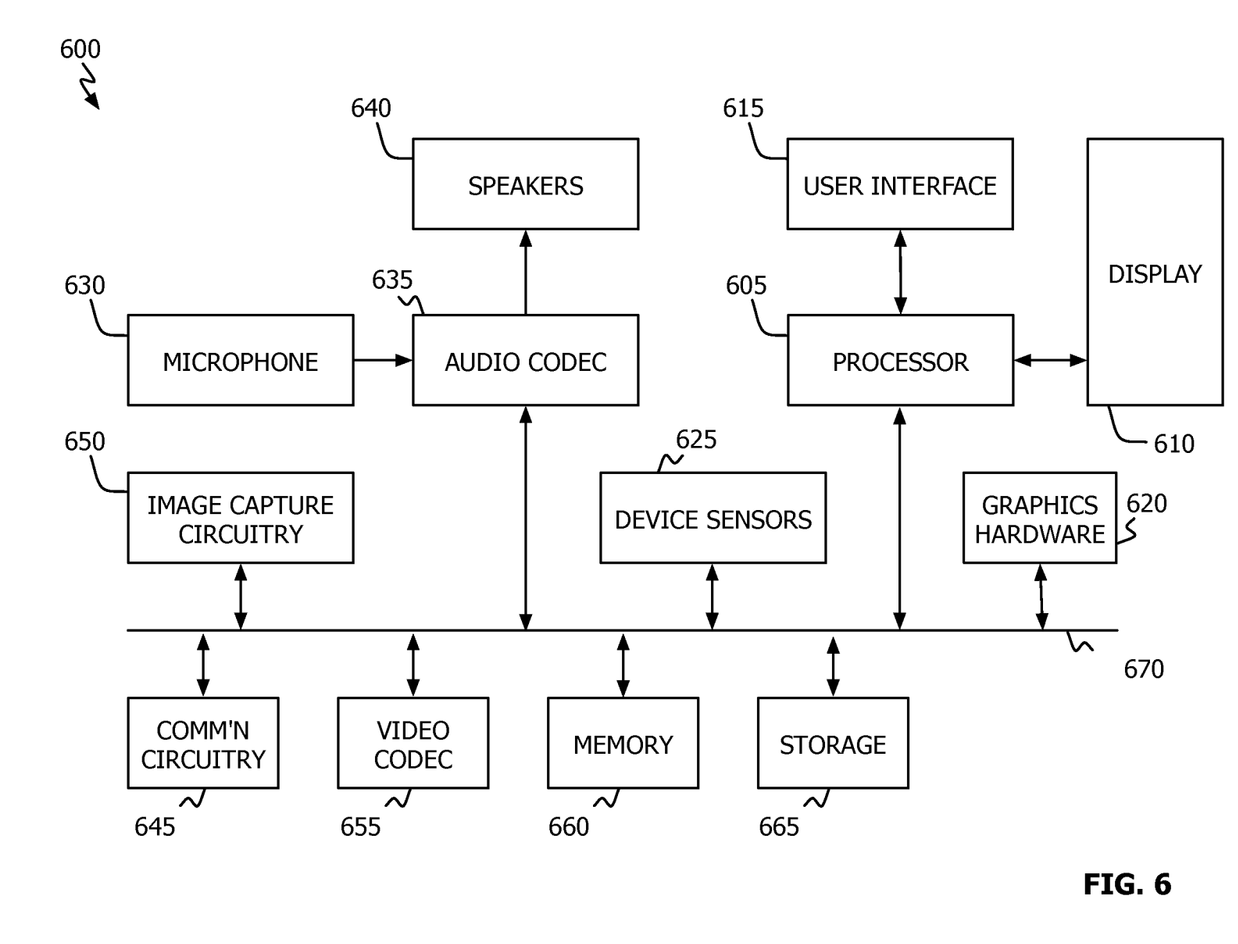
FIG. 6 shows, in block diagram form, a multi-function electronic device in accordance with one embodiment.

Referring to FIG. 6, a simplified functional block diagram of illustrative electronic device 600 is shown according to one embodiment. Electronic device 600 could be, for example, a mobile telephone, personal media device, portable camera, or a tablet or notebook computer system. As shown, electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, image capture circuit or unit 650, video codec(s) 655, memory 660, storage 665, and communications bus 670.

Processor 605 may execute instructions (program code) necessary to carry out or control the operation of many functions performed by device 600 (e.g., such as the generation and/or processing of images in accordance with FIGS. 1-5). Processor 605 may, for instance, drive display 610 and receive user input from user interface 615. User interface 615 can take a variety of forms, such as a button, keypad, dial, a click wheel, keyboard, display screen and/or a touch screen. Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores or functionally similar processing elements. Graphics hardware 620 may be special purpose computational hardware for processing graphics and/or assisting processor 605 to perform computational tasks. In one embodiment, graphics hardware 620 may include one or more programmable graphics processing units (GPUs).

Image capture circuitry 650 may include one or more image sensors such as, for example, digital charge-coupled devices (CCDs) or complementary metal-oxide-semiconductors (CMOS) active pixel sensors. Image capture circuitry 650 may capture still and video images that may be processed to generate images in accordance with this disclosure. Output from image capture circuitry 650 may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605, graphics hardware 620, and image capture circuitry 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). For example, bracket capture operations have all been described as using a common bracket exposure time, $t_B$. In other embodiments, sub-exposure capture times may be changed in accordance with a motion's profile. For example, if the motion is known to be initially fast and then slower, shorter sub-exposure times may be used during the quick portion of the motion and longer sub-exposure times may be used during the slower portion of the motion. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device comprising instructions stored thereon to cause one or more processors in an image capture device to:
   receive an initial exposure time;
   partition the initial exposure time into a plurality of sub-exposure times;
   capture, for each sub-exposure time, a sub-exposure image and, at the same time, motion metadata corresponding to each sub-exposure image;
   select a subset of the plurality of sub-exposure images based, at least in part, on comparing the sub-exposure images according to at least one motion distance criterion and the motion metadata associated with each sub-exposure image;
   combine the subset of the sub-exposure images into a single image; and
   store the single image in a memory.

2. The non-transitory program storage device of claim 1, wherein the instructions to cause the one or more processors to receive an initial exposure time further comprise instructions to cause the one or more processors to determine whether image stabilization is beneficial is based, at least in part, on camera motion information and an image stabilization threshold.

3. The non-transitory program storage device of claim 1, wherein the motion metadata comprises motion information from one or more motion sensors affixed to, part of the camera, or both.

4. The non-transitory program storage device of claim 1, wherein the instructions to cause the one or more processors to select the subset of the plurality of sub-exposure images comprise instructions to cause the one or more processors to, for each of the plurality of sub-exposure images:
   identify a motion metric value for a sub-exposure image;
   select the sub-exposure image if the motion metric value is less than a threshold value determined from the at least one motion distance criterion; and
   discard the sub-exposure image if the motion metric value is greater than, or equal to, the threshold value determined from the at least one motion distance criterion.

5. The non-transitory program storage device of claim 1, wherein the instructions to cause the one or more processors to combine the subset of sub-exposure images comprise instructions to cause the one or more processors to:
   average the sub-exposure images within the subset of sub-exposure images that are wholly coincident; and
   perform a pixel-level analysis to identify objects having apparent motion between consecutively captured sub-exposure images within the subset of sub-exposure images for sub-exposure images that are not wholly coincident.

6. The non-transitory program storage device of claim 1, wherein the at least one motion distance criterion represents a least amount of relative motion amongst the sub-exposure images for a N number of sub-exposure images.

7. The non-transitory program storage device of claim 6, wherein the at least one motion distance criterion accounts for integer pixel shifts and sub-pixel shifts in representing the least amount of relative motion amongst the sub-exposure images.

8. The non-transitory program storage device of claim 1, wherein the at least one motion distance criterion represents a histogram mode.

9. The non-transitory program storage device of claim 8, wherein the instructions to cause the one or more processors to select the subset of the plurality of sub-exposure images comprise instructions to cause the one or more processors to:
   generate a distance histogram for each sub-exposure image based at least on the motion metadata; and
   compare the distance histogram for each sub-exposure image to the histogram mode.

10. An image capture method for a camera, comprising:
    receiving an initial exposure time;
    partitioning the initial exposure time into a plurality of sub-exposure times;
    capturing, for each sub-exposure time, a sub-exposure image and, at the same time, motion metadata corresponding to each sub-exposure image;
    selecting a subset of the plurality of sub-exposure images based, at least in part, on comparing the sub-exposure images according to at least one motion distance criterion and the motion metadata associated with each sub-exposure image;

combining the subset of the sub-exposure images into a single image; and storing the single image in a memory.

11. The method of claim 10, wherein the motion metadata comprises motion information from one or more motion sensors affixed to, part of the camera, or both.

12. The method of claim 10, wherein the act of selecting a subset of the plurality of sub-exposure images comprises, for each of the plurality of sub-exposure images:

identifying a motion metric value for a sub-exposure image;

selecting the sub-exposure image if the motion metric value is less than a first threshold value determined from the at least one motion distance criterion; and discarding the sub-exposure image if the motion metric value is greater than or equal to the threshold value determined from the at least one motion distance criterion.

13. The method of claim 10, wherein the at least one motion distance criterion represents a least amount of relative motion amongst the sub-exposure images for a N number of sub-exposure images.

14. The method of claim 13, wherein the at least one motion distance criterion accounts for integer pixel shifts and sub-pixel shifts in representing the least amount of relative motion amongst the sub-exposure images.

15. The method of claim 10, wherein the at least one motion distance criterion represents a histogram mode, and wherein the method further comprises:

generating a distance histogram for each sub-exposure image based at least on the motion metadata; and comparing the distance histogram for each sub-exposure image to the histogram mode.

16. A camera, comprising:

an image sensor;

one or more motion sensors affixed to, or a part of, the camera;

a memory operatively coupled to the image sensor; and one or more processing elements operatively coupled to the image sensor, one or more motion sensors, memory and display, and configured to execute program instructions stored in the memory to:

receive an initial exposure time, partition the initial exposure time into a plurality of sub-exposure times based, at least in part, on motion information from the one or more motion sensors, capture, for each of the plurality of sub-exposure times, a sub-exposure image and at the same time motion metadata for each of the sub-exposure image from the one or more motion sensors, select a subset of the plurality of sub-exposure images based, at least in part, on comparing the sub-exposure images according to at least one motion distance criterion and the motion metadata associated with each sub-exposure image, combine the subset of the sub-exposure images into a single image, and store the single image in the memory.

17. The camera of claim 16, wherein the instructions to cause the one or more processors to select the subset of the plurality of sub-exposure images comprise instructions to cause the one or more processors to, for each of the plurality of sub-exposure images:

identify a motion metric value for a sub-exposure image;

select the sub-exposure image if the motion metric value is less than or equal to a threshold value determined from the at least one motion distance criterion; and discard the sub-exposure image if the motion metric value is greater than the threshold value determined from the at least one motion distance criterion.

18. The camera of claim 16, wherein the instructions to cause the one or more processing elements to combine the subset of sub-exposure images comprise instructions to cause the one or more processing elements to:

average the sub-exposure images within the subset of sub-exposure images that are wholly coincident; and perform a pixel-level analysis of at least some of the plurality of sub-exposure images within the subset of sub-exposure images for sub-exposure images that are not wholly coincident.

19. The camera of claim 16, wherein the at least one motion distance criterion represents a least amount of relative motion amongst the sub-exposure images for a N number of sub-exposure images.

20. The camera of claim 16, wherein the at least one motion distance criterion represents a histogram mode, and wherein the instructions to cause the one or more processing elements to select the subset of the plurality of sub-exposure images comprise instructions to cause the one or more processing elements to:

generate a distance histogram for each sub-exposure image based at least on the motion metadata; and compare the distance histogram for each sub-exposure image to the histogram mode.

* * * * *